United States Patent
Bulin et al.

(10) Patent No.: US 8,499,822 B2
(45) Date of Patent: Aug. 6, 2013

(54) SYSTEM FOR COOLING AND ADJUSTING THE TEMPERATURE OF APPARATUSES IN THE PROPULSION ASSEMBLY OF AN AIRCRAFT

(75) Inventors: Guillaume Bulin, Blagnac (FR);
Stephane Pugliese, L'Union (FR);
Fabre Christian, Tournefeuille (FR);
Patrick Oberle, Verdun sur Garonne (FR)

(73) Assignee: Airbus Operations SAS, Toulouse (FR)

( * ) Notice: Subject to any disclaimer, the term of this patent is extended or adjusted under 35 U.S.C. 154(b) by 757 days.

(21) Appl. No.: 12/532,696

(22) PCT Filed: Mar. 25, 2008

(86) PCT No.: PCT/FR2008/050508
§ 371 (c)(1),
(2), (4) Date: May 3, 2010

(87) PCT Pub. No.: WO2008/132400
PCT Pub. Date: Nov. 6, 2008

(65) Prior Publication Data
US 2010/0212857 A1 Aug. 26, 2010

(30) Foreign Application Priority Data
Mar. 28, 2007 (FR) ...................... 07 54089

(51) Int. Cl.
*F01N 5/02* (2006.01)
(52) U.S. Cl.
USPC ............................ 165/51; 165/41; 244/134 R

(58) Field of Classification Search
USPC .................. 244/134 R, 134 B, 53 R; 60/736, 60/730, 39.83, 39.093, 266, 267, 226.1; 165/41, 165/51, 52; 62/239, 243, 244, 323.1
See application file for complete search history.

(56) References Cited

U.S. PATENT DOCUMENTS

| 4,773,212 A * | 9/1988 | Griffin et al. ................... 60/772 |
| 6,105,370 A * | 8/2000 | Weber ............................. 60/733 |
| 6,182,435 B1 | 2/2001 | Niggemann et al. |
| 6,253,554 B1 * | 7/2001 | Kobayashi et al. ............. 60/736 |
| 6,263,664 B1 * | 7/2001 | Tanigawa et al. ............ 60/39.54 |
| 6,415,595 B1 * | 7/2002 | Wilmot et al. .................. 60/785 |
| 6,679,059 B2 * | 1/2004 | Kobayashi et al. ............. 60/736 |

(Continued)

FOREIGN PATENT DOCUMENTS

| DE | 12 81 270 B | 10/1968 |
| EP | 0 391 609 A | 10/1990 |

(Continued)

OTHER PUBLICATIONS

International Search Report dated Dec. 15, 2008.

*Primary Examiner* — Philip J Bonzell
(74) *Attorney, Agent, or Firm* — Dickinson Wright PLLC

(57) ABSTRACT

A system for cooling and adjusting the temperature of apparatuses in the propulsion assembly of an aircraft, that includes first means for heat exchange between lubrication circuits of at least two of the aforementioned apparatuses and a heat-carrier fluid contained in a closed circuit, a second means for heat exchange between the heat-carrier fluid and at least one coolant, the first heat exchange means being arranged locally at each of the aforementioned apparatuses, the second heat exchange means being remote from the aforementioned first means, the closed circuit extending between at least two of the aforementioned apparatuses and the aforementioned second means.

10 Claims, 3 Drawing Sheets

U.S. PATENT DOCUMENTS

| | | | |
|---|---|---|---|
| 6,857,270 B2 * | 2/2005 | Kobayashi et al. | 60/736 |
| 6,993,913 B2 * | 2/2006 | Kobayashi et al. | 60/736 |
| 7,143,581 B2 * | 12/2006 | Kobayashi et al. | 60/728 |
| 2001/0022087 A1 * | 9/2001 | Kobayashi et al. | 60/736 |
| 2002/0092301 A1 * | 7/2002 | Kobayashi et al. | 60/736 |
| 2003/0056513 A1 * | 3/2003 | Kobayashi et al. | 60/728 |
| 2004/0045294 A1 * | 3/2004 | Kobayashi et al. | 60/728 |
| 2006/0225425 A1 * | 10/2006 | Kobayashi et al. | 60/736 |
| 2007/0044451 A1 * | 3/2007 | Jones | 60/226.1 |

FOREIGN PATENT DOCUMENTS

| | | |
|---|---|---|
| GB | 2 095 756 A | 10/1982 |
| GB | 2 131 094 A | 6/1984 |
| WO | 02/16743 A | 2/2002 |

* cited by examiner

SYSTEM FOR COOLING AND ADJUSTING THE TEMPERATURE OF APPARATUSES IN THE PROPULSION ASSEMBLY OF AN AIRCRAFT

CROSS-REFERENCE TO RELATED APPLICATIONS

This application is the National Stage of International Application No. PCT/FR2008/050508 International Filing Date, 25 Mar. 2008, which designated the United States of America, and which International Application was published under PCT Article 21 (s) as WO Publication No. WO2008/132400 A2 and which claims priority from, and the benefit of, French Application No. 200754089 filed on 28 Mar. 2007, the disclosures of which are incorporated herein by reference in their entireties.

The aspects of the disclosed embodiments relate to a system for cooling and adjusting the temperature of apparatuses in the propulsion assembly of an aircraft, the propulsion assembly incorporating the system, and the aircraft that is equipped with it.

BACKGROUND

A propulsive assembly of an aircraft such as a turbojet engine comprises several systems that need to be cooled or held at an optimal operating temperature such as the turbomachine and the electrical apparatuses like the electric generator of the aircraft.

It is also necessary to limit the temperature of the lubricating oil for the moving parts of the turbomachine and to remove the heated given off by the bearings and frictional parts.

The systems traditionally cooled or temperature-controlled by a cooling circuit in the engine are the electric generators coupled to the engine (turbomachine) and the moving parts of the engine.

Two cooling principles are also known that are generally used for propulsion systems.

The first consists of cooling by oil/air heat exchange, with a heat exchanger arranged in a shunt circuit that draws air from the secondary cold flow of the engine.

This first principle is disadvantageous for the efficacy of the propulsion assembly because it takes air from the engine and/or it introduces a loss of supplementary aerodynamic pressure. To limit this drawback, it is now acceptable to integrate a valve in the exchanger to regulate the flow of air taken from the engine. Nevertheless, these regulating valves detract from the global reliability of the cooling system and are the origin of numerous service problems (appearance of cracks in the valves and the pipes because of aerodynamic vibrational stresses, occurrence of valve control system failures, etc.).

This first principle is also disadvantageous for the acoustic handling of the internal surface of the secondary flow. Actually, the larger the size of the exchanger to be integrated, the more air will enter it (and leave it if the flow of tapped air is discharged into the secondary flow), since the intake and discharge of air have no acoustic treatment, and therefore it is desirable to keep their amounts low to control engine noise.

The presence of the exchanger is unfavorable because it opposes reducing the dimensions of the air inlet and outlet.

The second principle is to use the fuel that feeds the engine as coolant, and in this case, one or more fuel/oil exchangers are used, traditionally of the plate or tube types of exchangers, which are integrated in the propulsion assembly.

These exchangers provide for dissipation of the heat energy in the fuel used by the engine.

Still, the fuel must not be heated beyond a certain temperature (~150° C.) so as not to involve any risk of coking. For this reason, some propulsion assemblies draw an amount of fuel from the reservoirs of the aircraft that is much greater than the actual need of the engine for combustion, and return the unused heated fuel to the reservoirs.

As for the air/oil exchanger devices, the fuel/oil exchangers cannot generally be arranged close to the devices to be cooled, and here again the oil circuits have to be lengthened between the devices to be cooled and the exchangers.

In conclusion, regardless of the principle used, the devices to be cooled, or heat sources, are cooled and regulated through the expediency of their own lubricating systems, which implies lengthening these circuits to the exchangers remote from these sources of heat.

The oil circuits also have a dual function of lubricating and cooling in the prior art.

Because of this dual function, the oil circuits of the various components to be cooled must imperatively be segregated to limit the risks of combined failures (contamination of one oil circuit involving the contamination of another circuit, leakage in one oil circuit involving the total loss of circuits, etc.), which further increases the lengths and number of pipes for oil circulation.

To the extent that each cooling circuit is dedicated to a specific apparatus (engine or electric generator), each circuit also has to possess at least one cooling device of a size for the most compelling cooling (example: maximum electric consumption under "hot weather" conditions with the airplane on the ground). Since not every cooling circuit is necessarily subject to the most compelling case in the same phases of flight, the cooling devices are almost never used 100% at the same time. There is then excess cooling capacity installed on the propulsion assembly, which is unfavorable for the performance of the propulsion assembly to the extent that the segregation rule has to be complied with, and increases its weight and its volume.

Furthermore, the fact that in the known devices the cooling circuit constitutes in parallel the lubricating circuit for the heat sources imposes several constraints on the integration of said circuit. First of all, to the extent that the oil circuit has to be linked to the heat source at the different exchangers that are not necessarily close to one another, the volume, length, and complexity of the oil circuit imposes pressure losses in the circuit and a substantial volume of oil. In other respects, the oil circulation all around the engine increases the risk of leaks, contamination, and fires in the propulsion assembly, which means a certain vulnerability of the cooling system and of the associated propulsion assembly.

Finally, the lubricating oil is not the most appropriate liquid for the transport of heat energy because of its significant viscosity and its non-optimal heat capacity, and because the cooling circuit of each heat source is cooled and temperature-controlled through the expediency of its own lubricating circuit, the shortest possible lubricating circuit is imposed to limit the pressure losses and the risk of leaks. It is then difficult to envisage connecting the cooling system(s) of the various components of the propulsion assembly, and even more difficult to envisage connecting them to those of the airplane. Thus no synergy is possible between the cooling capacities of the airplane and of the propulsion assembly, or between the heat sources of the airplane and of the propulsion assembly, which impedes any communication between the thermal devices, but such synergies would permit more extensive optimization of the cooling systems.

FIG. 1 shows an example of a system of the prior art.

In this example, the lubricating oil circuit 11 flows in the engine nacelle to reach the coolers 12, 13 of the fuel/oil heat exchanger type, and the lubricating oil circuit 14 of the electric generator extends to the cooler 15 of the fuel/oil type located in the recirculation circuit for the engine fuel supply.

FIG. 2, also of the prior art, shows an aircraft engine 1 that has a nacelle 2 and a propulsion assembly 3 provided with air/oil exchangers 6, 8 located in the conduits 7, 9 and 4, 5 diverting a portion of the secondary flow to cool the exchangers.

SUMMARY

The principal purpose of the aspects of the disclosed embodiments is to minimize the circulation of lubricating oil for the apparatuses outside of the apparatuses to be cooled, and to separate the lubricating function from the cooling function.

It also provides for making common use of the cooling means between various apparatuses, by combining the cooling capacities of each component, permitting heat exchanges between dissipating sources, and in particular dissipating sources whose cooling requirements differ as a function of the operating phases of the aircraft.

To do this, the aspects of the disclosed embodiments provide a cooling and temperature-regulating system for equipment of an aircraft propulsion assembly that has first heat exchangers between the lubricating circuits of at least two such apparatuses and a heat transfer fluid contained in a closed circuit, and second heat exchangers between the heat transfer fluid and at least one cooling fluid, with the first heat exchangers being arranged locally with each of said apparatuses, with the second heat exchangers being distant from said first exchangers, and with the closed circuit circulating between at least two of the apparatuses and said second exchangers.

The disclosed embodiments also relate to an aircraft propulsion assembly that has at least one such cooling system.

BRIEF DESCRIPTION OF THE DRAWINGS

Other characteristics and advantages of the disclosed embodiments will be apparent from reading the following description of non-limiting examples of embodiment of the disclosed embodiments, with reference to the drawings, which show.

DETAILED DESCRIPTION

Examples of cooling and temperature-regulating systems 10, 23 of an aircraft propulsion assembly 3 pursuant to the present disclosed embodiments are shown in FIGS. 3 to 6.

Figure 3:
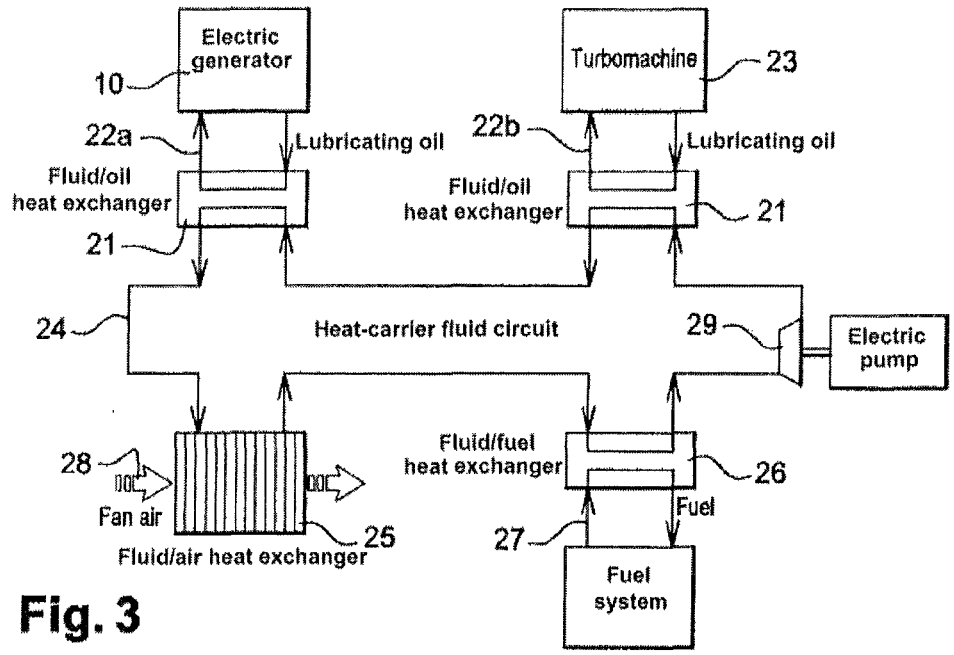
in FIG. 3: a first schematic example of embodiment of a system pursuant to the disclosed embodiments.

The system whose flow chart is shown in FIG. 3 is the basic flow chart of the system of the disclosed embodiments, which comprises first heat exchangers 21 between the lubricating systems 22a, 22b of at least two apparatuses that are by priority the electric generator 10 of the propulsion assembly and the turbomachine 23 itself.

These two apparatuses have large lubrication requirements and high operating constraints since the electric generator 10 has the role of furnishing electric power for the aircraft, and the turbomachine has the role of furnishing the thrust to move the aircraft.

To optimize the cooling of these two apparatuses without detracting from their lubrication, the disclosed embodiments place the first heat exchangers 21 as close as possible to these apparatuses, and depends on a heat transfer fluid contained in a closed circuit 24 to transport the calories to be evacuated to second heat exchangers 25, 26 acting between the heat transfer fluid and at least one cooling fluid 27, 28.

Thus, the first heat exchangers 21 are placed locally at each of the said apparatuses 10, 23, and the second heat exchangers 25, 26 are placed closer to the place where the cooling fluid circulates, with the second heat exchangers 25, 26 thus being distant from the said first exchangers 21.

A first benefit of the disclosed embodiments is that with the closed circuit 24 circulating between at least two of the apparatuses 10, 23 and the said second exchangers 25, 26, the apparatuses share the means of cooling. The first exchangers can also remain close to the apparatuses and the second exchangers can be located at the most propitious places for cooling without lengthening the lubricating systems of the apparatuses.

The first heat exchangers 22a, 22b are heat transfer fluid/oil exchangers associated with the apparatuses 10, 23.

The heat transfer fluid is thus a fluid suitable for this function.

The heat transfer fluid will preferably be nontoxic, noninflammable, and will have low viscosity and good heat capacity. By way of non-limiting example, the heat transfer fluid may be pure water or water mixed with one or more additives that improve its properties, for example water with glycol added to avoid solidification of the heat transfer fluid in case of very low temperatures of use.

According to the example, the heat transfer fluid circuit passes through multiple liquid/liquid heat exchangers, with each exchanger being specific for one heat source to be cooled and providing for the exchange of heat energy between the heat transfer fluid of the cooling circuit and the lubricating oil of this source of heat.

These exchangers of heat between the hot sources and the heat transfer fluid circuit can be situated either close to the hot sources or on the wall or within the hot sources, or at any other place in the propulsion assembly chat that may be favorable in terms of integration of the system.

A non-limiting example of embodiment is to position a heat exchanger in contact with the oil in the lubricating oil reservoir of the hot source in question.

The heat is then directly exchanged in the heart of the hot source and accordingly requires no lubricating circuit passing outside of the envelope of the said source and progressing around the propulsion assembly.

To make the heat transfer fluid circulate, the closed circuit 24 includes a pump 29 to circulate the heat transfer fluid.

Always according to the example of FIG. 3, the second heat exchangers comprise at least one heat transfer fluid/air exchanger 25 in contact with at least a portion 28 of the secondary air flow, moving between the nacelle and the engine of the propulsion assembly.

Figure 1:
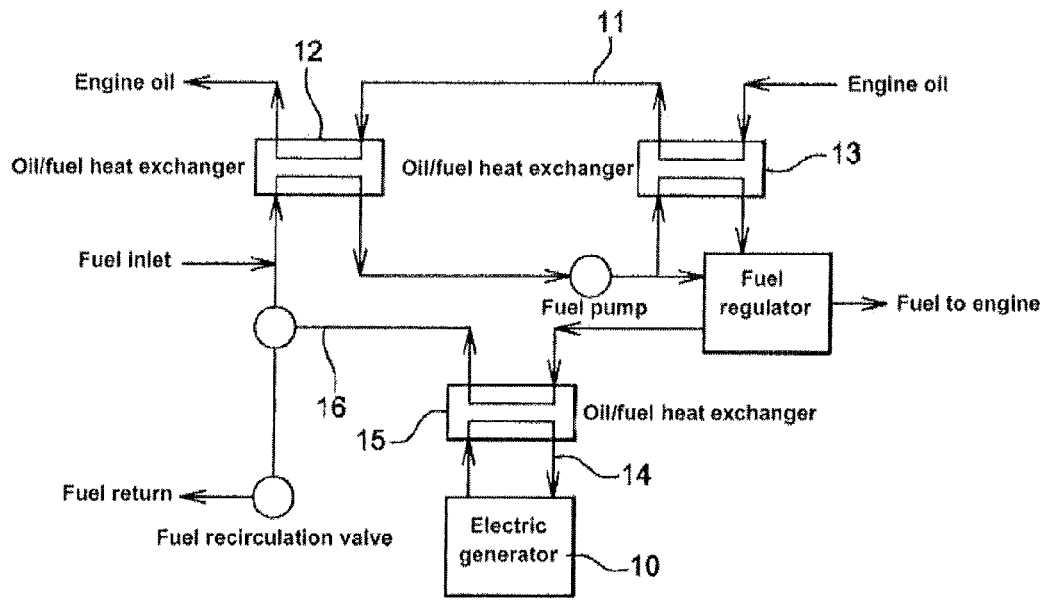
in FIG. 1: an example of a cooling system for apparatuses of the prior art.
Figure 2:
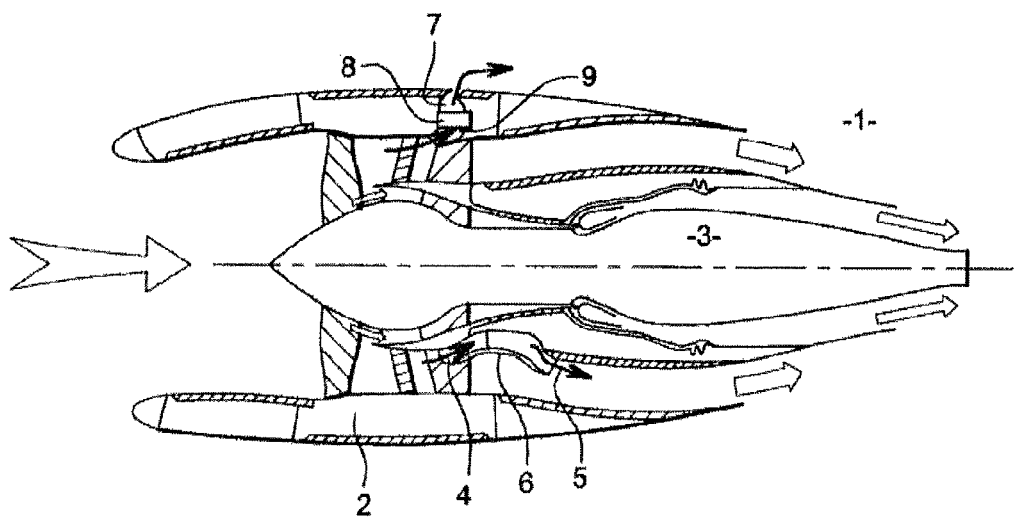
in FIG. 2: an example of an aircraft propulsion assembly provided with air/fluid exchangers.

This exchanger may particularly be arranged in place of an oil/air exchanger of the prior art like those shown in FIG. 2.

Alternatively or in parallel, the second heat exchangers may comprise at least one heat transfer fluid/fuel exchanger 26 placed in the fuel supply circuit 27 for the propulsion assembly.

The fuel supply circuit in this case may include, as in the prior art, fuel recirculation to the reservoir to limit the temperature increase caused by the exchange of heat.

As seen above, the principal apparatuses to be cooled comprise at least one electric generator 10 and the turbomachine 23 of the propulsion assembly.

Figure 6:
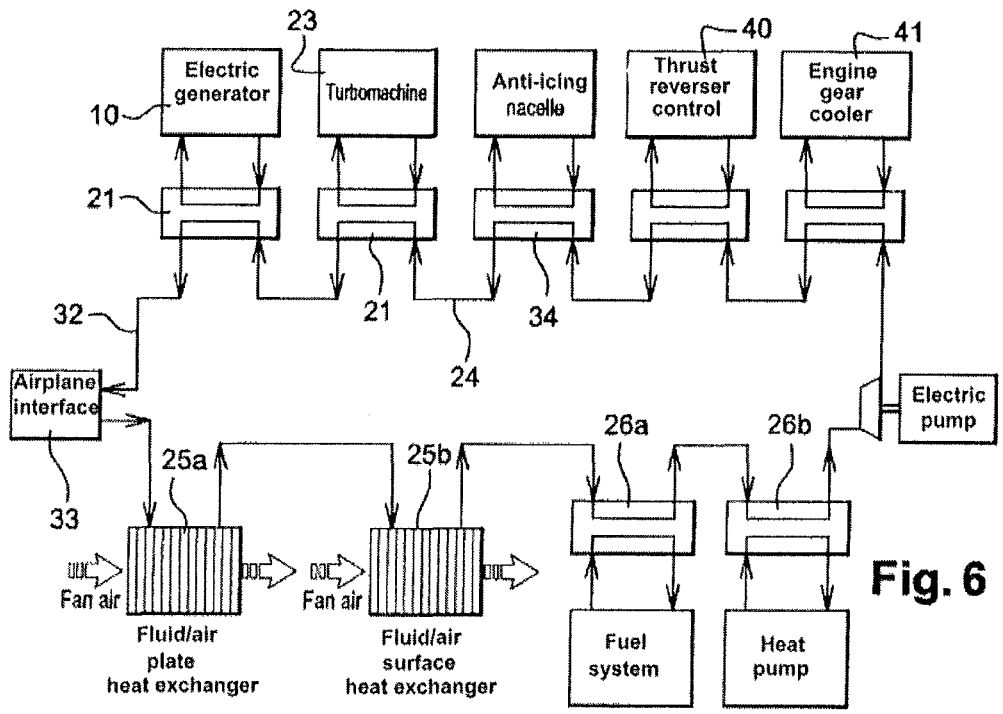
in FIG. 6: a schematic example of a cooling system pursuant to the disclosed embodiments that has an interface with the apparatuses outside of the propulsion assembly.

In FIG. 6, however, the disclosed embodiments are applied particularly to the cooling of other elements of the propulsion assembly, and specifically to thrust-reversing control devices 40 and to the engine gearing 41.

This is made possible by using a circuit 24 leading between the apparatuses instead of having a lubricating circuit for each apparatus lengthened to the exchangers.

Figure 4:
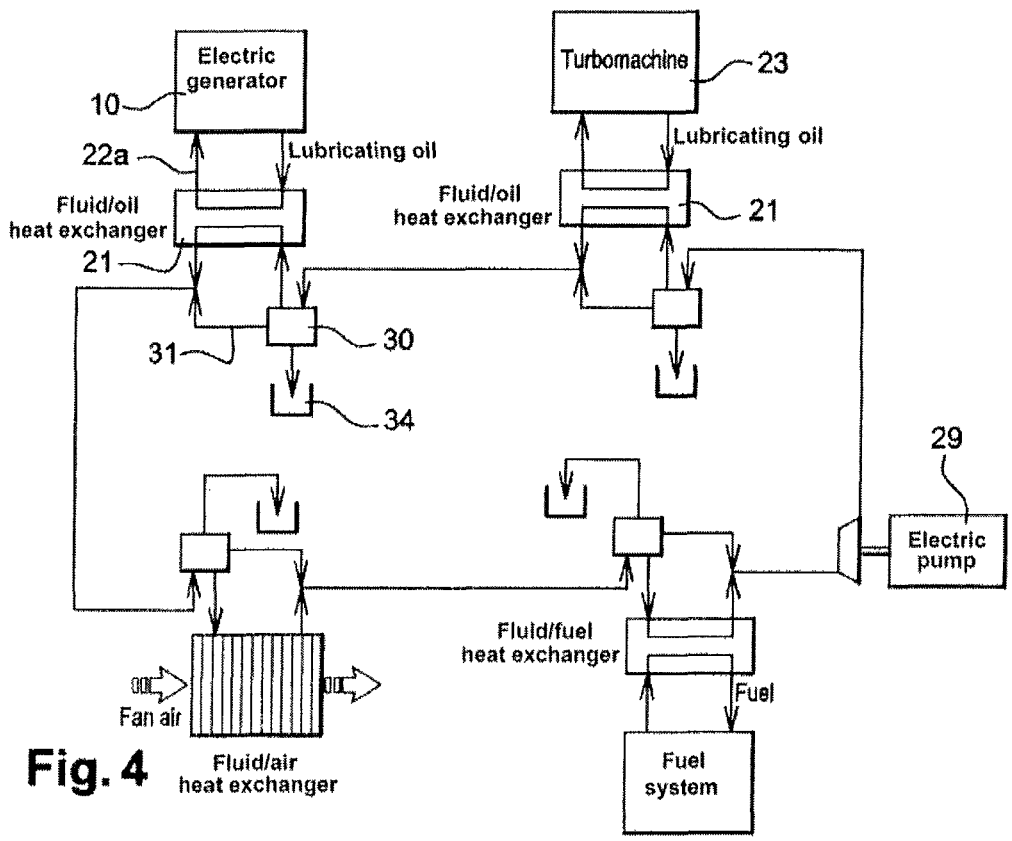
in FIG. 4: a second example of embodiment of a system pursuant to the disclosed embodiments.

The system shown in FIG. 4 is improved, in that at the location of at lest one of the first heat exchangers 21, the closed circuit has a regulating device suitable for regulating the amount of heat transfer fluid admitted into this first heat exchanger 21.

The regulating device comprises a valve 30 that distributes the heat transfer fluid to the first exchanger 21 or to a bypass conduit 31 of the said at least one first heat exchanger.

An allocation device (not shown in FIG. 4) directs the valve 30 as a function of given regulating parameters such as the external temperature, the temperature of the oil, and the operating phase of the device.

Otherwise, a heat transfer fluid return device 34 returns to the reservoir the fluid that exceeds the flow rate controlled by the regulating device.

Figure 5:
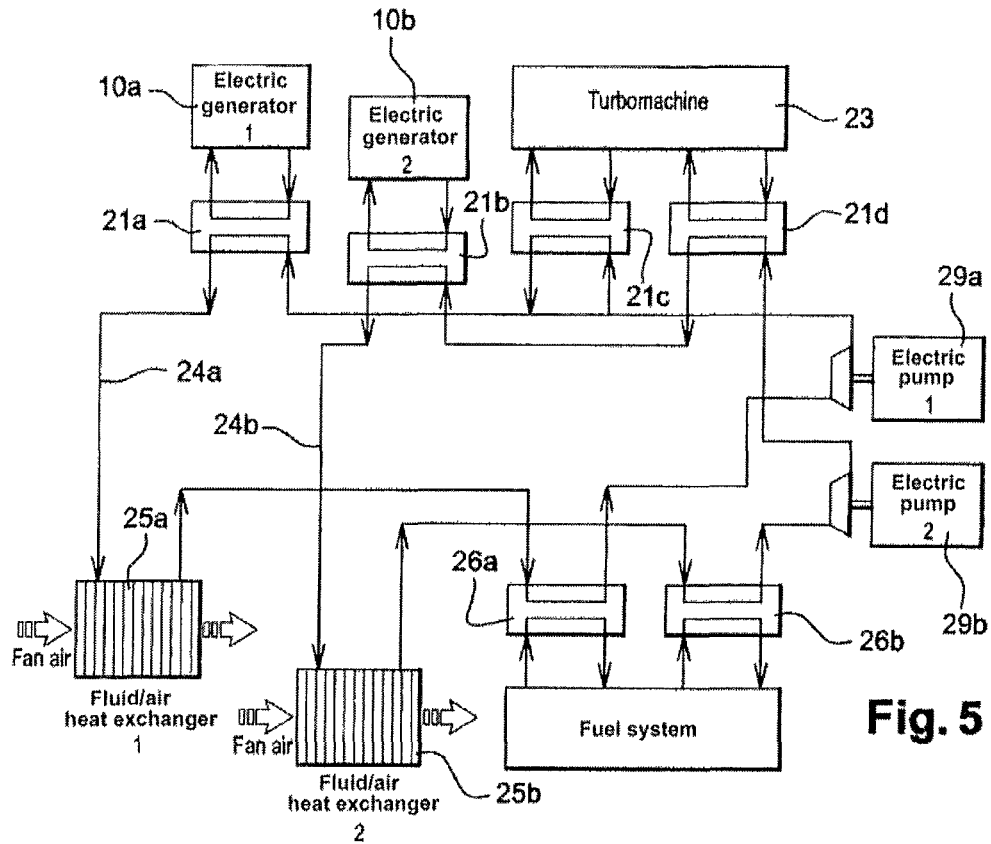
in FIG. 5: an example of embodiment of a redundant system pursuant to the disclosed embodiments.

FIG. 5 shows a cooling system for a propulsion assembly that has at least two cooling systems described above, with the two systems being independent and segregated.

A first system has a first circuit 24a that distributes a first oil/fluid exchanger 21a from a first electric generator of the propulsion assembly and a first oil/fluid exchanger 21c from the turbomachine, and which exchanges the calories transmitted with a first second fluid/air exchanger 25a and a first second fluid/fuel exchanger 26a.

The circulation of the heat transfer fluid from this first circuit is provided for by a first pump 29a.

A second system has a second circuit 24b that distributes a second oil/fluid exchanger 21b from a second electric generator of the propulsion assembly and a second oil/fluid exchanger 21d from the turbomachine, and which exchanges the calories transmitted with a second second fluid/air exchanger 25b and a second second fluid/fuel exchanger 26b.

The circulation of the heat transfer fluid from this second circuit is provided for by a second pump 29b.

To avoid any risk of combined leaks or of rupture of the two circuits in case of a shock or the impact of a bird, for example, the two circuits are segregated in particular by their distance from one another, for example by positioning them diametrically opposite relative to the axis of the propulsion assembly.

In this example, it should be pointed out that the two cooling systems are arranged so that they supplement one another to assure redundancy of the apparatuses, and in particular at the turbomachine 23 for which the circuits pass through distinct exchangers.

There also, in case of a problem in one of the circuits, the other remains operational, which permits the continued use of the propulsion assembly, certainly while limiting the power of the turbomachine to limit its heating.

The use of a heat transfer fluid circuit also permits using the heat transfer fluid to heat the elements of the propulsion assembly, and in particular according to a particular embodiment of the disclosed embodiments, the closed circuit 24 also distributes an anti-icing heating module 34 of the propulsion assembly.

In a known way, this module can be placed in the air intake rim of the engine.

In the example of FIG. 6, the system is also linked to a heat transfer fluid system 32 serving aircraft equipment outside of the propulsion assembly through an interface 33.

Such equipment can be equipment such as the deicing equipment for the wings using the heat transmitted by the heat transfer fluid, and equipment that requires cooling such as the air conditioning unit, with the link between the system and the air conditioning system providing for the dissipation of the caloric energy from the air conditioning system using the cooling capacities of the propulsion assembly.

Actually, during these landing phases, if the propulsion assemblies are operating, it would be completely practical to dissipate the caloric energy from the air conditioner in the flow of air passing through the turbomachines via the available cooling capacities of the cooling systems of the propulsion assemblies.

The disclosed embodiments are not limited to the examples described and includes any variant within the scope of the claims.

The invention claimed is:

1. A cooling and temperature-regulating system for equipment of an aircraft propulsion assembly, comprising:
   at least two first heat exchangers respectively located between lubricating circuits of at least two apparatuses and a closed circuit containing heat transfer fluid, and
   at least two second heat exchangers, with each of the second heat exchangers located between the closed circuit containing the heat transfer fluid and at least one of the second exchangers being a fluid/air exchanger,
   wherein
   the heat transfer fluid contained in the closed circuit comprises water,
   each of the first heat exchangers is arranged locally with respect to each of said apparatuses,
   each of the second heat exchangers is arranged distant from said first heat exchangers, and
   the closed circuit is configured to circulate the heat transfer fluid contained in the closed circuit between the first and said second exchangers and cool the at least two apparatuses.

2. The cooling and temperature-regulating system of claim 1, wherein the first heat exchangers comprise heat transfer fluid/oil exchangers associated with the apparatuses.

3. The cooling system of claim 1, wherein the second heat exchangers comprise at least one heat transfer fluid/air exchanger in contact with at least a portion of a secondary air flow that moves between a nacelle and an engine of the propulsion assembly.

4. The cooling system of claim 1, wherein the second heat exchangers comprise at least one heat transfer fluid/fuel exchanger positioned in a fuel supply system of the propulsion assembly.

5. The cooling system of claim 1, wherein the apparatuses comprise at least one electric generator and a turbomachine of the propulsion assembly.

6. An aircraft comprising at least one propulsion assembly equipped with at least one cooling system according to claim 1, wherein the closed circuit also distributes at least one anti-icing heating module of the propulsion assembly.

7. An aircraft propulsion assembly comprising at least one cooling system according to claim 1.

8. The aircraft propulsion assembly of claim 7, comprising at least two cooling systems according to claim 1, with the two systems being independent and segregated.

9. An aircraft comprising at least one propulsion assembly equipped with at least one cooling system according to claim 1, wherein said system is linked to a heat transfer fluid system that serves aircraft equipment outside of the propulsion assembly.

10. The aircraft of claim 9, wherein the closed heat transfer fluid circuit is linked to exchangers of an air conditioning system, providing for dissipation of the caloric energy of the air conditioning system through the cooling capacities of the propulsion assembly.

* * * * *